(12) United States Patent
Hu

(10) Patent No.: US 8,403,763 B2
(45) Date of Patent: Mar. 26, 2013

(54) UNIVERSAL JOINT

(76) Inventor: Hou-Fei Hu, Taichung (TW)

( * ) Notice: Subject to any disclaimer, the term of this patent is extended or adjusted under 35 U.S.C. 154(b) by 0 days.

(21) Appl. No.: 13/081,589

(22) Filed: Apr. 7, 2011

(65) Prior Publication Data
US 2011/0182654 A1 Jul. 28, 2011

Related U.S. Application Data

(63) Continuation-in-part of application No. 12/167,544, filed on Jul. 3, 2008, now abandoned.

(51) Int. Cl.
*F16D 3/26* (2006.01)

(52) U.S. Cl. .......................... 464/112; 403/123

(58) Field of Classification Search .................. 464/106, 464/112, 113, 120, 151; 403/122, 123; 81/177.75
See application file for complete search history.

(56) References Cited

U.S. PATENT DOCUMENTS

| | | | |
|---|---|---|---|
| 1,225,524 A * | 5/1917 | Swartz | 464/120 |
| 1,686,695 A | 10/1928 | Heon | 464/120 |
| 4,065,941 A | 1/1978 | Aoki | 464/115 |
| 4,936,701 A | 6/1990 | Allen et al. | 403/57 |
| 6,105,473 A | 8/2000 | Huang | 81/177.75 |
| 6,145,416 A * | 11/2000 | Bonniot | 81/177.75 |
| 6,490,955 B2 | 12/2002 | Chang-Kao et al. | 81/177.75 |
| 8,104,382 B2 * | 1/2012 | Hu | 81/177.75 |
| 2004/0152523 A1 | 8/2004 | Lai | 464/112 |

FOREIGN PATENT DOCUMENTS

JP 3157067 U * 1/2010

OTHER PUBLICATIONS

German Patent Publication No. DE 3144739 A1, May 19, 1983, 8 pages.
Chinese Patent Publication No. CN 1986141A, Jun. 27, 2007, 19 pages.
UK Patent Publication No. GB 1113978A, May 15, 1968, 9 pages.
UK Patent Publication No. GB 222563A, Oct. 2, 1924, 5 pages.
UK Patent Publication No. GB 1033327A, Jun. 22, 1966, 3 pages.

* cited by examiner

*Primary Examiner* — Gregory Binda
*Assistant Examiner* — Josh Skroupa
(74) *Attorney, Agent, or Firm* — Alan Kamrath; Kamrath IP Lawfirm, P.A.

(57) ABSTRACT

A universal joint includes a rotating member having a pivotal portion received in a compartment defined by a peripheral wall at an end of a base. The rotating member includes a coupling portion and an interconnecting portion between the pivotal portion and the coupling portion. The interconnecting portion has a minimum diameter smaller than the maximum diameter of the pivotal portion but not smaller than a width of the coupling portion. A groove extends through the pivotal portion. A pin is extended through the peripheral wall of the base and the groove. The pivotal portion is pivotable relative to the base through an angle in the order of 90°.

10 Claims, 7 Drawing Sheets

UNIVERSAL JOINT

CROSS REFERENCE TO RELATED APPLICATION

This is a continuation-in-part application of U.S. patent application Ser. No. 12/167,544 filed Jul. 3, 2008, now abandoned.

BACKGROUND

The present invention relates to a universal joint and, more particularly, to a universal joint allowing operation through a larger pivotal angle and capable of withstanding high torque.

U.S. Pat. No. 4,065,941 discloses a universal joint including a tubular housing and a first ball joint having an input shaft. A ball member is disposed at an end of the input shaft and pivotably received in the housing. An attaching head having square cross sections is disposed at the other end of the input shaft and can be engaged with an impact wrench and the like. The first ball joint can pivot relative to the tubular housing until it abuts the first end of the housing. The maximum pivotal travel of the first ball joint in the tubular housing is approximately 60°, which is still too small for use in limited spaces. A second ball joint is provided to a second end of the housing to compensate for the limited pivotal travel of the first ball joint. However, the resultant universal joint is liable to shake or vibrate, causing damage to the universal joint. Furthermore, the diameter of the input shaft is smaller than the width between two opposite sides of the attaching head, such that the input shaft is liable to deform or even break when subjected to large-torque rotation.

Thus, a need exists for a novel universal joint that allows operation through a larger pivotal angle while withstanding high torque during operation.

BRIEF SUMMARY

This need and other problems in the field of universal joints are solved by providing, in an aspect, a universal joint including a base having first and second ends spaced along a first axis. The first end of the base includes a peripheral wall defining a receiving recess. The receiving recess includes first and second compartments. The peripheral wall includes two aligned holes each extending in a radial direction perpendicular to the first axis. The second end of the base includes an engaging portion. The second compartment is located intermediate the first compartment and the engaging portion. A rotating member includes first and second ends spaced along a second axis. The first end of the rotating member includes a pivotal portion received in the receiving recess of the base. The second end of the rotating member includes a coupling portion having square cross sections and spaced from the pivotal portion along the second axis. The rotating member further includes a conical interconnecting portion between the pivotal portion and the coupling portion. The coupling portion includes two opposite surfaces on opposite sides of the second axis. The two opposite surfaces of the coupling portion have a width perpendicular to the second axis. A groove extends through a center of the pivotal portion. The groove includes first and second sidewalls on an end thereof. The groove further includes third and fourth sidewalls on the other end thereof spaced from the end of the groove along the second axis. The first and third sidewalls are located on a first side of the second axis and spaced from each other by 90°. The second and fourth sidewalls are located on a second side of the second axis opposite to the first side of the second axis. The second and fourth sidewalls are spaced from each other by 90°. The pivotal portion is spherical and has a maximum diameter. The interconnecting portion has a minimum diameter adjacent to the coupling portion. The minimum diameter of the interconnecting portion is smaller than the maximum diameter of the pivotal portion but not smaller than the width of the coupling portion. A pin extends through the holes of the peripheral wall of the base and the groove of the pivotal portion of the rotating member. The pin and the groove allow relative pivotal movement between the pivotal portion of the rotating member and the base about a pivot axis between first and second positions. The pivot axis is perpendicular to the first and second axes and passing through the center of the pivotal portion. The first and second positions are spaced from each other by 90°.

In the form shown, the peripheral wall of the base includes an inner periphery having a conical abutment section facing the first compartment. The abutment section is rectilinear in cross section and at an acute angle to the first axis. The interconnecting portion is rectilinear in cross section and at an acute angle to the second axis. The holes of the base are defined in the abutment section. The interconnecting portion and the abutment section have a contact surface therebetween when the second axis is at 45° to the first axis. The contact surface has first and second ends spaced along the first axis. The pin includes a central axis defining the pivot axis. The central axis of the pin is located intermediate first and second ends of the contact surface along the first axis. The inner periphery of the peripheral wall of the base further includes an enveloping section facing the first compartment. The enveloping section is concavely arcuate in cross section and extends between the abutment section and the second compartment. The pivotal portion has a spherical surface in surface contact with the enveloping section. The force exerting on the rotating member is transmitted through the enveloping section to the base, reducing the force imparted to the pin. The second axis extends through the enveloping section when the second axis is at 45° to the first axis. Force along the second axis is transmitted directly through the pivotal portion to the enveloping section of the base. The inner periphery of the peripheral wall of the base further includes a receiving section facing the first compartment and extending between the abutment section and an end edge of the peripheral wall. The receiving section is arcuate in cross section. The minimum diameter of the interconnecting portion of the rotating member has a spacing to the maximum diameter of the pivotal portion along the second axis. The spacing is larger than a half of the maximum diameter of the pivotal portion but smaller than the maximum diameter of the pivotal portion. The minimum diameter of the interconnecting portion of the rotating member abuts the receiving section of the base when the second axis is at 45° to the first axis. The force exerting on the rotating member is transmitted through the receiving section to the base, reducing the force imparted to the pin.

Illustrative embodiments will become clearer in light of the following detailed description described in connection with the drawings.

DESCRIPTION OF THE DRAWINGS

The illustrative embodiments may best be described by reference to the accompanying drawings where.

Figure 1:
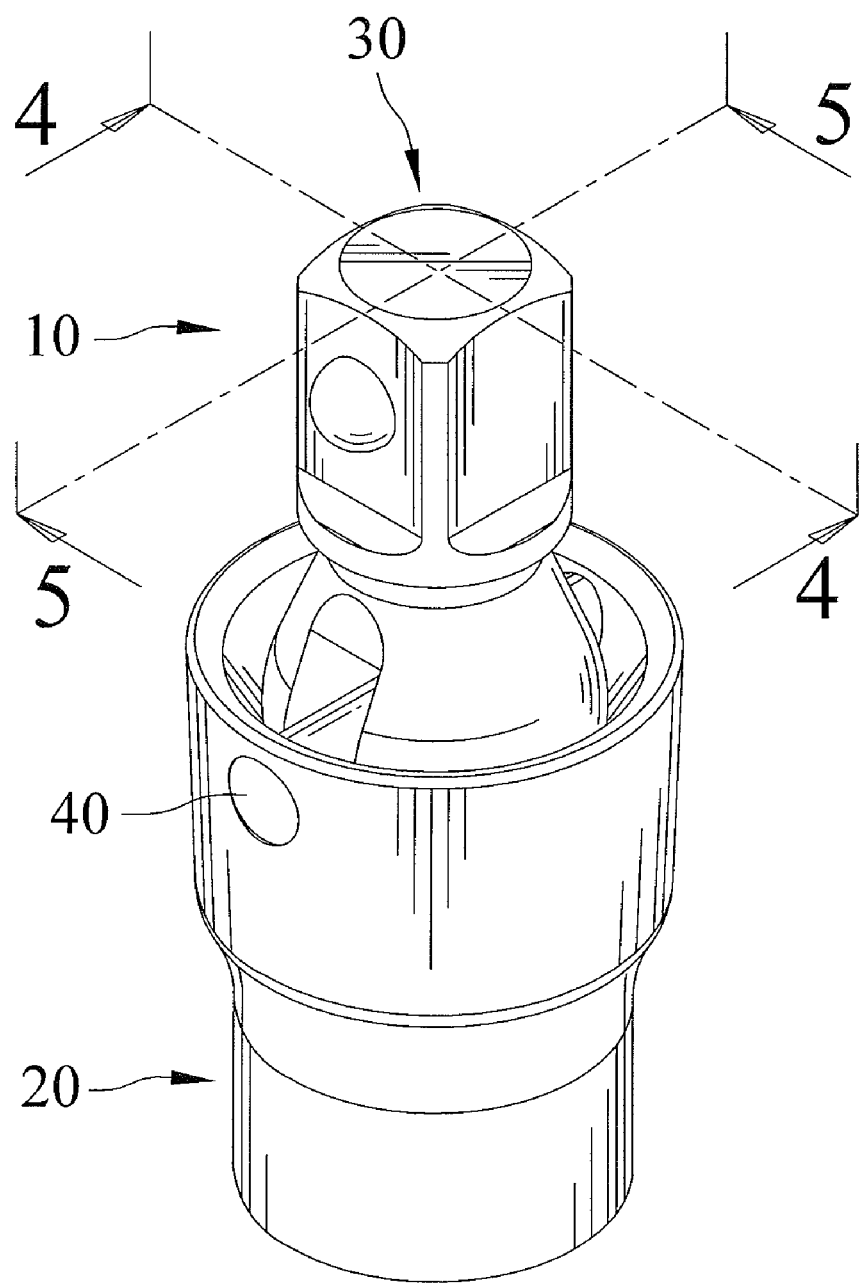
FIG. 1 shows a perspective view of a universal joint according to the present invention.
Figure 2:
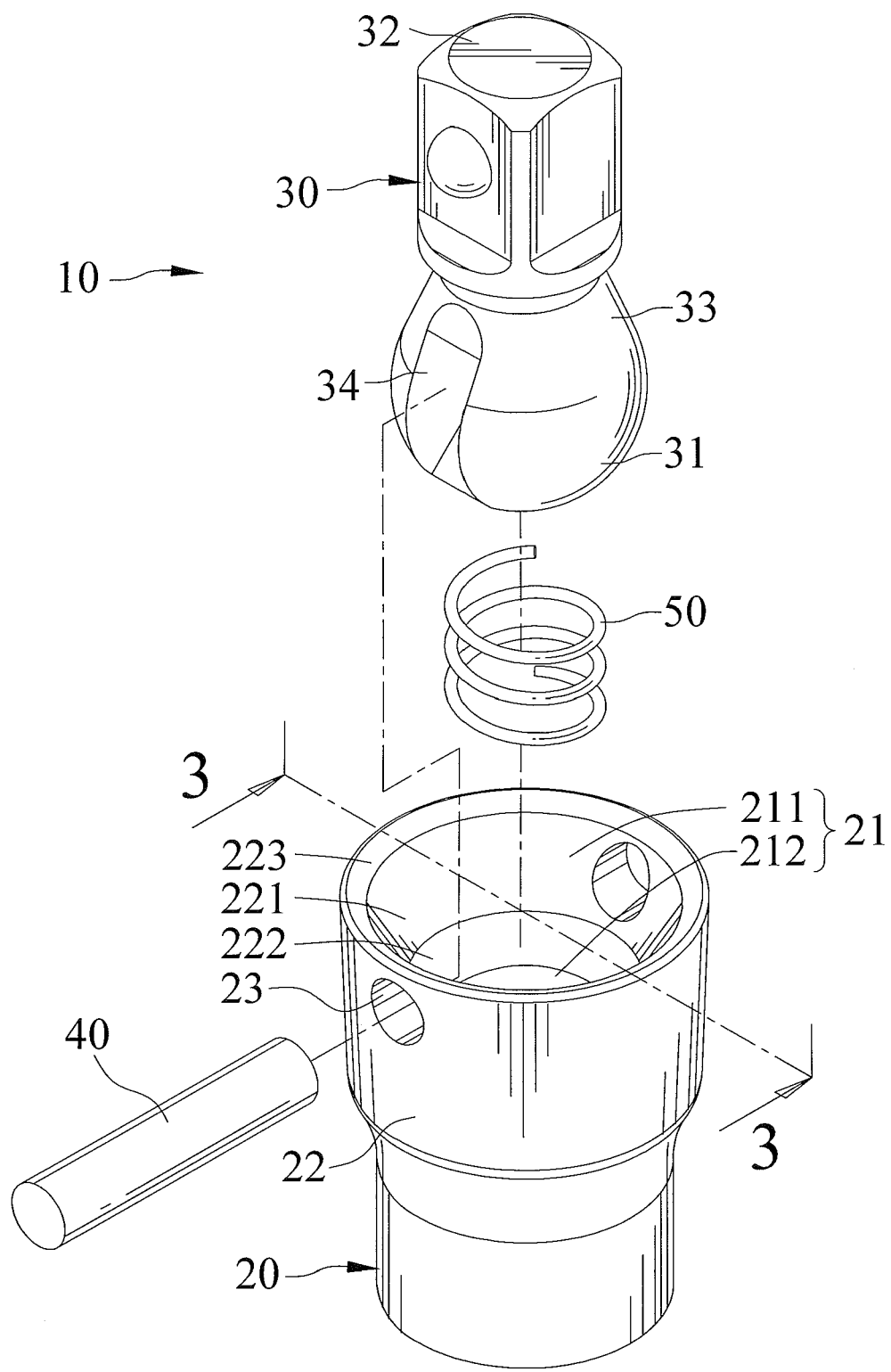
FIG. 2 shows an exploded, perspective view of the universal joint of FIG. 1.
Figure 3:
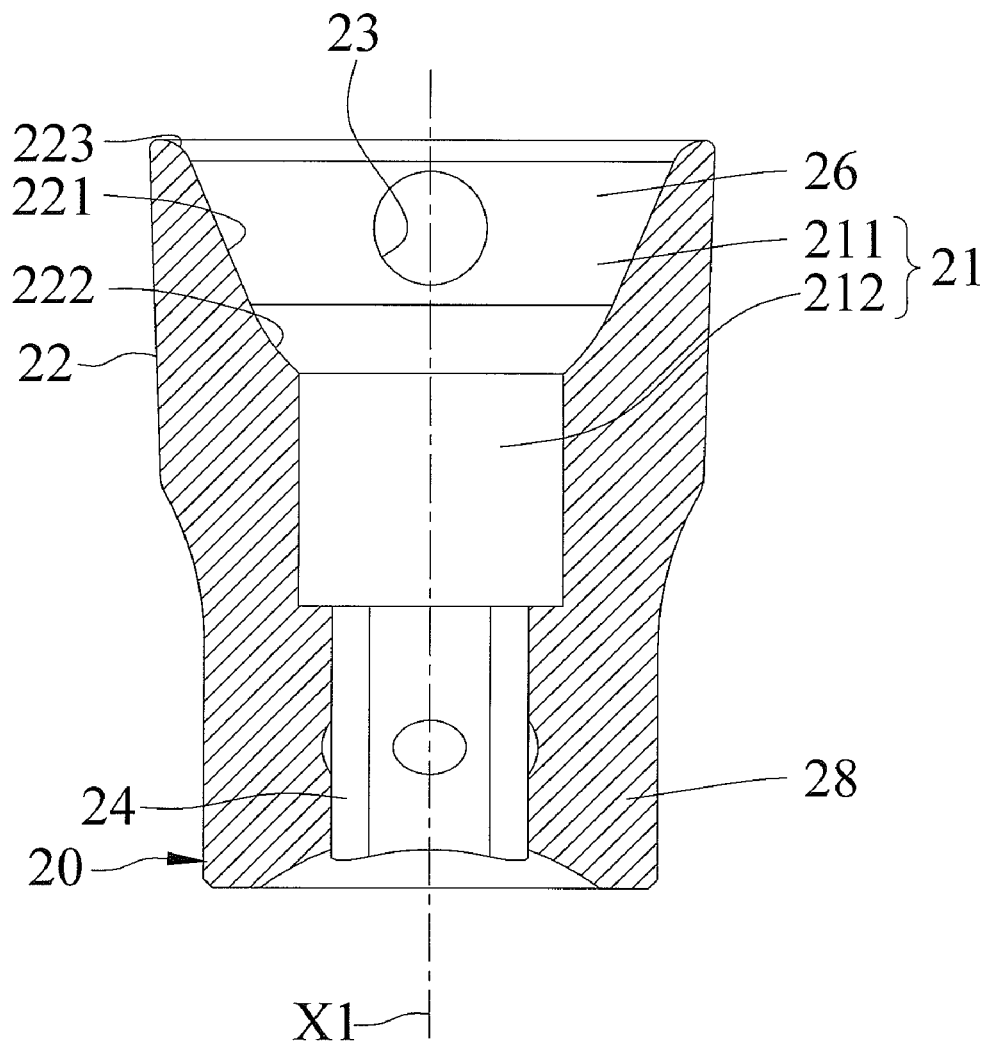
FIG. 3 shows a cross sectional view of a base of the universal joint of FIG. 2 according to section line 3-3 of FIG. 2.
Figure 4:
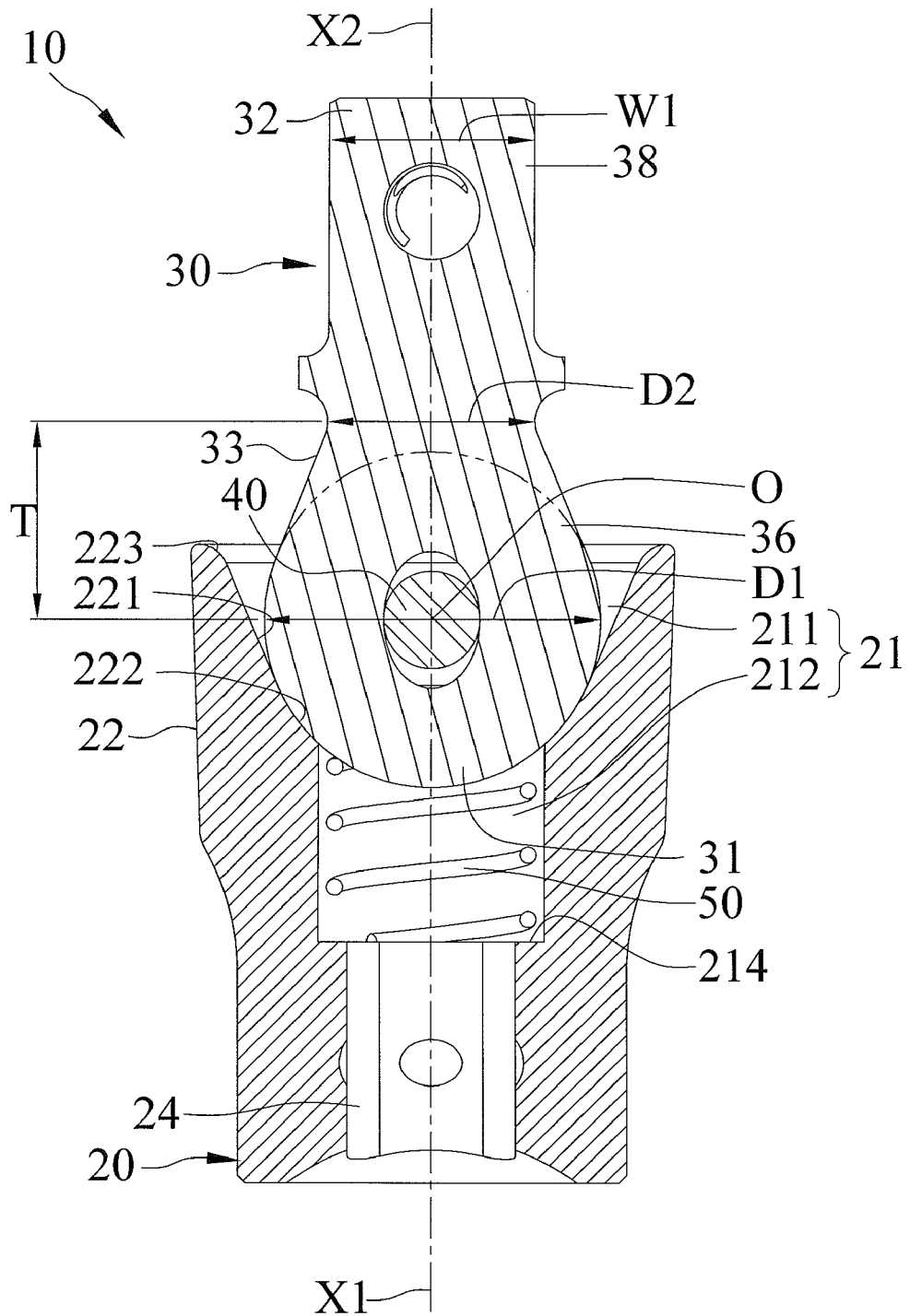
FIG. 4 shows a cross sectional view of the universal joint of FIG. 1 according to section line 4-4 of FIG. 1.
Figure 5:
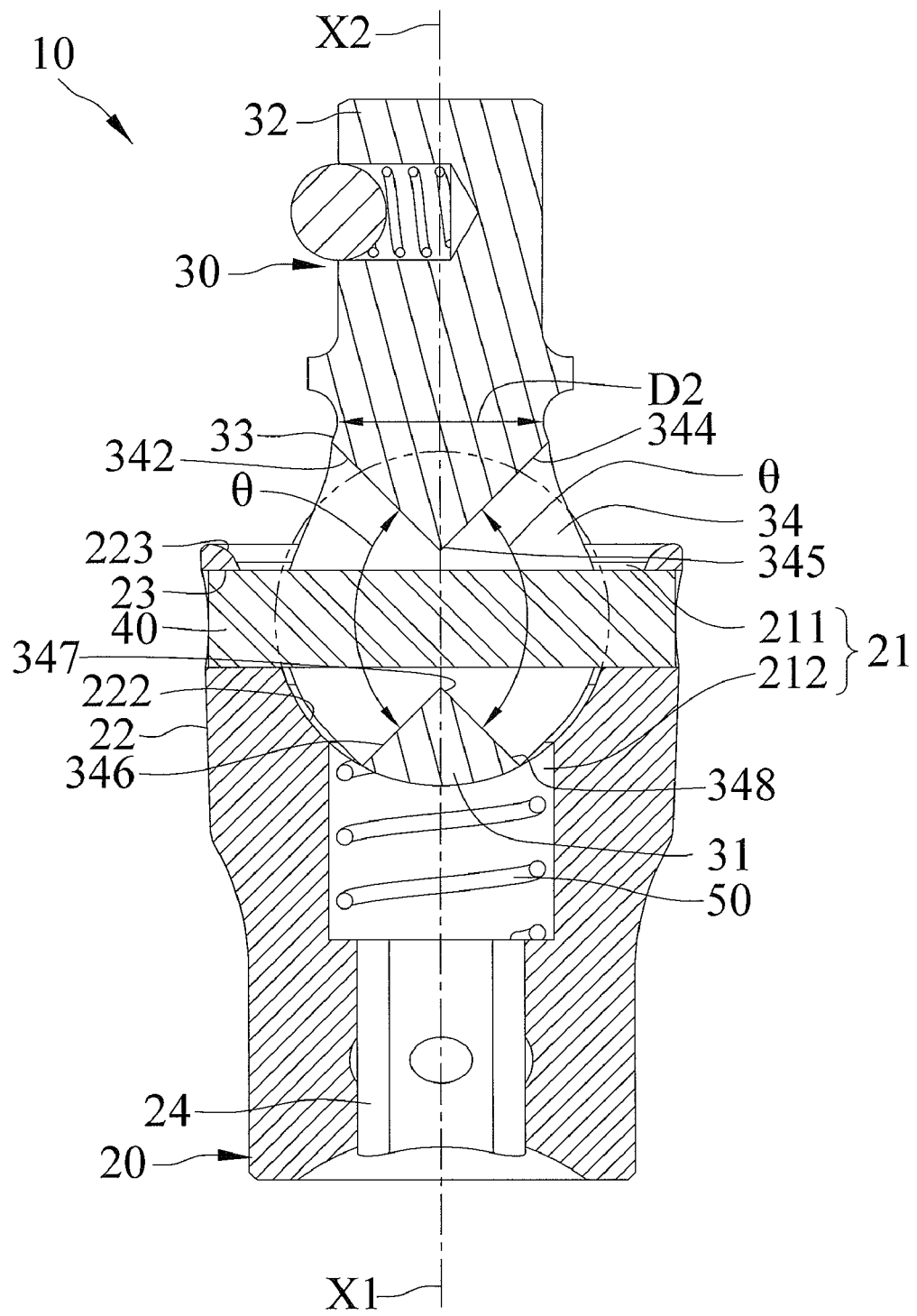
FIG. 5 shows a cross sectional view of the universal joint of FIG. 1 according to section line 5-5 of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "lower", "upper", "side", "end", "portion", "section", "spacing", "width", and similar terms are used herein, it should be understood that these terms have reference only to the structure shown in the drawings as it would appear to a person viewing the drawings and are utilized only to facilitate describing the illustrative embodiments.

DETAILED DESCRIPTION

A universal joint according to the present invention is shown in the drawings and generally designated 10. According to the form shown, universal joint 10 includes a base 20 and a rotating member 30 pivotably connected to base 20. Base 20 includes first and second ends 26 and 28 spaced along a first axis X1. First end 26 of base 20 includes a peripheral wall 22 defining a receiving recess 21. Receiving recess 21 includes first and second compartments 211 and 212. Peripheral wall 22 includes two aligned holes 23 each extending in a radial direction perpendicular to first axis X1. Second end 28 of base 20 includes an engaging portion 24 in the form of a groove having square cross sections for engaging with a wrench or an extension rod. Second compartment 212 is located intermediate the first compartment 211 and engaging portion 24.

According to the form shown, peripheral wall 22 of base 20 includes an inner periphery having a conical abutment section 221 that faces first compartment 211 and that is at an acute angle to first axis X1. The inner periphery of peripheral wall 22 of base 20 further includes an enveloping section 222 facing first compartment 211. Enveloping section 222 extends between abutment section 221 and second compartment 212 and is concavely arcuate in cross section. The inner periphery of peripheral wall 22 of base 20 further includes a receiving section 223 facing first compartment 211 and extending between abutment section 221 and an end edge of peripheral wall 22. Receiving section 223 is convexly arcuate in cross section. Thus, first compartment 211 is substantially trumpet-shaped due to the shapes of abutment section 221, enveloping section 222, and receiving section 223.

According to the form shown, holes 23 of base 20 are defined in abutment section 221. Namely, holes 23 are located intermediate enveloping section 222 and receiving section 223.

According to the form shown, rotating member 30 includes first and second ends 36 and 38 spaced along a second axis X2. First end 36 of rotating member 30 includes a pivotal portion 31 received in first compartment 211 of receiving recess 21 of base 20. Second end 38 of rotating member 30 includes a coupling portion 32 spaced from the pivotal portion 31 along second axis X2. Coupling portion 32 has square cross sections for engaging with a socket or the like. Rotating member 30 further includes a conical interconnecting portion 33 between pivotal portion 31 and coupling portion 32. Interconnecting portion 33 is rectilinear in cross section and at an acute angle to second axis X2. Coupling portion 32 includes two opposite surfaces on opposite sides of second axis X2. The two opposite surfaces of coupling portion 32 have a width W1 perpendicular to second axis X2.

According to the form shown, a groove 34 extends through a center O of pivotal portion 31. Groove 34 is substantially X-shaped in cross section. Specifically, groove 34 includes first and second sidewalls 342 and 344 on an end thereof. Groove 34 further includes third and fourth sidewalls 346 and 348 on the other end thereof spaced from the end of groove 34 along second axis X2. First and third sidewalls 342 and 346 are located on a first side of second axis X2 and spaced from each other by an angle θ in the order of 90°. Second and fourth sidewalls 344 and 348 are located on a second side of second axis X2 opposite to the first side of second axis X2. Second and fourth sidewalls 344 and 348 are spaced from each other by an angle θ in the order of 90°. Each of first, second, third, and fourth sidewalls 342, 344, 346, and 348 is at 45° to second axis X2. First and second sidewalls 342 and 344 meet each other at a first connection edge 345. Third and fourth sidewalls 346 and 348 meet each other at a second connection edge 347. First and second connection edges 345 and 347 are spaced from each other and located on second axis X2.

According to the form shown, pivotal portion 31 is spherical and has a maximum diameter D1. Interconnecting portion 33 has a minimum diameter D2 adjacent to coupling portion 32. Minimum diameter D2 of interconnecting portion 33 is smaller than maximum diameter D1 of pivotal portion 31 but not smaller than width W1 of coupling portion 32. Thus, interconnecting portion 33 of rotating member 30 can withstand high torque, reducing damage during rotation of universal joint 10.

According to the form shown, a pin 40 extends through holes 23 of peripheral wall 22 of base 20 and groove 34 of pivotal portion 31 of rotating member 30. Pin 40 is located between first and second connection edges 345 and 347. By such an arrangement of pin 40 and groove 34, pivotal portion 31 of rotating member 30 can pivot relative to base 20 about a pivot axis perpendicular to first and second axes X1 and X2 and passing through center O of pivotal portion 31. Namely, rotating member 30 is pivotable relative to pin 40 about the pivot axis between first and second positions that are spaced from each other by 90.degree. In the form shown, pin 40 is spaced from first and second connection edges 345 and 347 when first axis X1 is coincident to second axis X2, providing a tolerance for operation and/or manufacturing. However, pin 40 can be in contact with first and second connection edges 345 and 347.

In use, coupling portion 32 of rotating member 30 is engaged with a fastener through a socket or the like. Engaging portion 24 of base 20 is engaged with a wrench or the like and is driven to rotate. Rotating member 30 rotates about second axis X2 to tighten or loosen the fastener while base 20 rotates about first axis X1. The relative angular position between base 20 and rotating member 30 will not change during rotation of universal joint 10.

The spherical surface of pivotal portion 31 of rotating member 30 and enveloping section 222 of base 20 are in surface contact with each other during rotation of universal joint 10. Thus, force exerting on rotating member 30 during rotation of universal joint 10 can be transmitted through enveloping section 222 to base 20, reducing the force imparted to pin 40 while increasing the torque of universal joint 10. Furthermore, shaking during rotation of universal joint 10 can be effectively reduced, providing stable operation.

Conical interconnecting portion 33 can be in contact with abutment section 221 when pivotal portion 31 is in a range of angular locations relative to base 20. In this case, the force exerting on rotating member 30 during rotation of universal joint 10 can be transmitted to base 20 through abutment section 221, reducing the force imparted to pin 40. Furthermore, shaking during rotation of universal joint 10 can be effectively reduced, providing stable operation.

According to the form shown, minimum diameter D2 of interconnecting portion 33 of rotating member 30 has a spacing T to maximum diameter D1 of pivotal portion 31 along second axis X2. Spacing T is larger than a half of maximum diameter D1 of pivotal portion 31 but smaller than maximum diameter D1 of pivotal portion 31. Minimum diameter D2 of interconnecting portion 33 of rotating member 30 abuts receiving section 223 of base 20 when second axis X2 is at 45° to first axis X1. The force exerting on rotating member 30 during rotation of universal joint 10 can be transmitted through receiving section 223 to base 20, reducing the force imparted to pin 40. Furthermore, shaking during rotation of universal joint 10 can be effectively reduced, providing stable operation.

Figure 6:
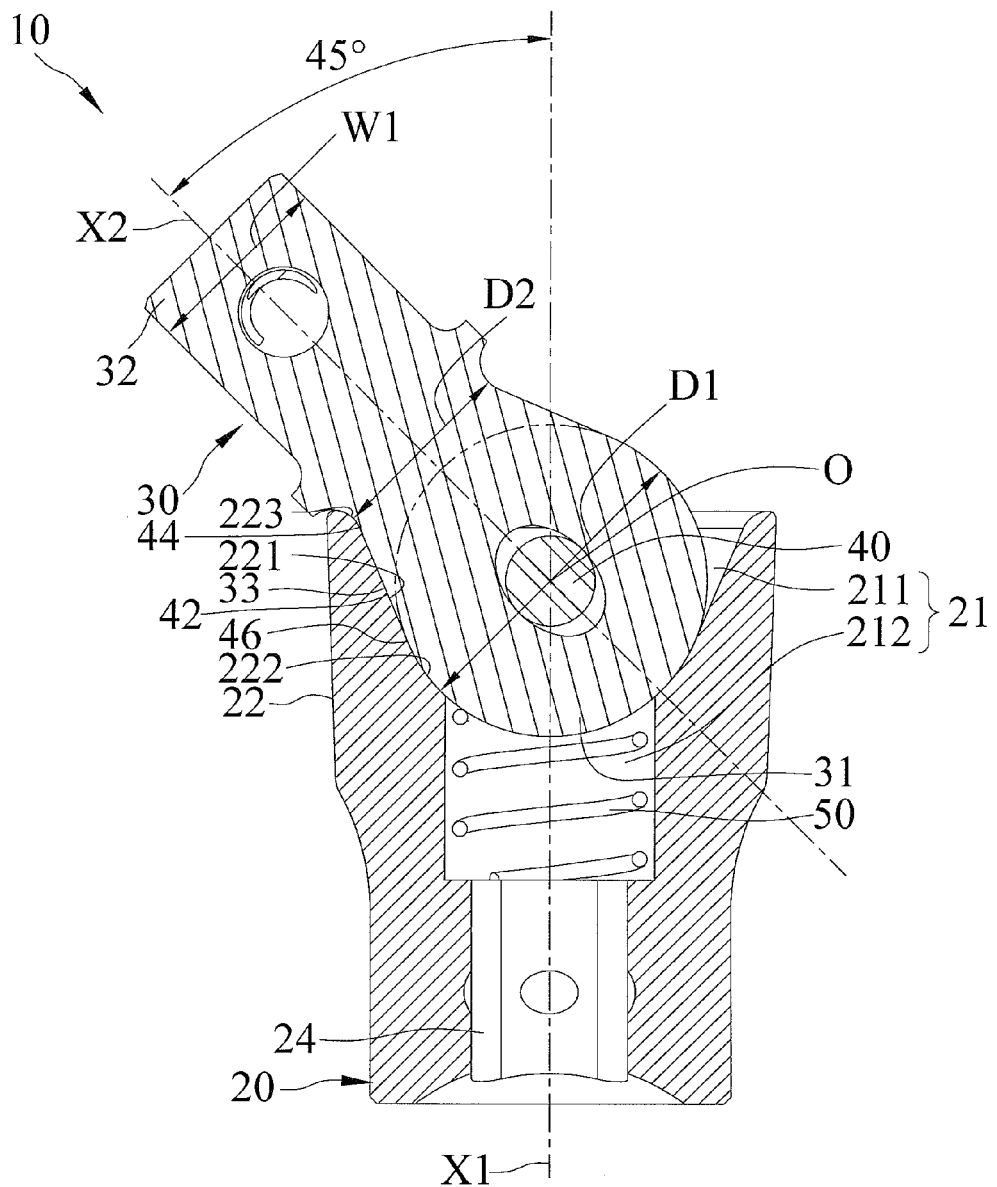
FIG. 6 shows a view similar to FIG. 4, illustrating pivotal movement of a pivotal member of the universal joint relative to the base.
Figure 7:
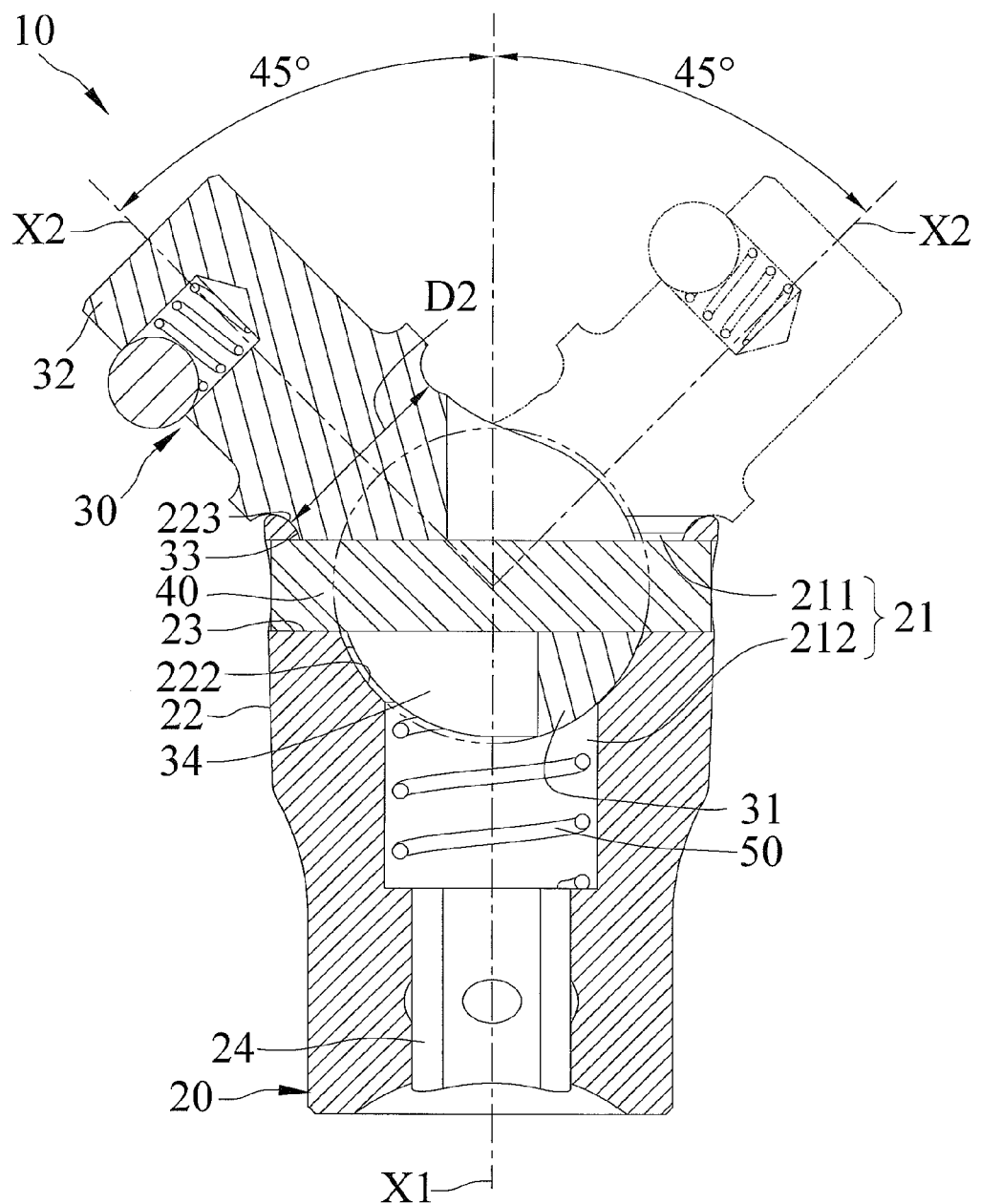
FIG. 7 shows a view similar to FIG. 5, illustrating pivotal movement of the pivotal member relative to the base.

With reference to FIG. 6, interconnecting portion 33 and abutment section 221 have a contact surface 42 therebetween when second axis X2 is at 45° to first axis X1. Contact surface 42 has first and second ends 44 and 46 spaced along first axis X1. Pin 40 includes a central axis defining the pivot axis and passes through center O. The central axis of pin 40 is located intermediate first and second ends 44 and 46 of contact surface 42 along first axis X1. Thus, force exerting on both sides of pin 40 can be uniformly transmitted to abutment section 221 of base 20, effectively reducing the force imparted to pin 40.

When pivotal portion 31 is in either of the first and second positions relative to base 20 (i.e., second axis X2 is at 45° to first axis X1) or in a location between the first and second positions, the relative position therebetween will not change while base 20 rotates about first axis X1 and while rotating member 30 rotates about second axis X2 during rotation of universal joint 10. Second axis X2 extends through enveloping section 222 when second axis X2 is at 45° to first axis X1. Force along second axis X2 can be directly transmitted through pivotal portion 31 to enveloping section 222 of base 20, reducing the force imparted to pin 40. Furthermore, shaking during rotation of universal joint 10 can be effectively reduced, providing stable operation.

According to the form shown, a spring 50 is mounted in second compartment 212 and between an end wall 214 of second compartment 212 and pivotal portion 31. Spring 50 presses against pivotal portion 31, reducing wobbling of rotating member 30 and providing stable pivotal movement.

Although each of angle θ between first and third sidewalls 342 and 346 and angle θ between second and fourth sidewalls 344 and 348 in the form shown is the order of 90°, each of angles θ can be in a range between 88° and 92° due to tolerance.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A universal joint comprising, in combination:
a base including first and second ends spaced along a first axis, with the first end of the base including a peripheral wall defining a receiving recess, with the receiving recess including first and second compartments, with the peripheral wall including two aligned holes each extending in a radial direction perpendicular to the first axis, with the second end of the base including an engaging portion, with the second compartment located intermediate the first compartment and the engaging portion;
a rotating member including first and second ends spaced along a second axis, with the first end of the rotating member including a pivotal portion received in the receiving recess of the base, with the second end of the rotating member including a coupling portion having square cross sections and spaced from the pivotal portion along the second axis, with the rotating member further including a conical interconnecting portion between the pivotal portion and the coupling portion, with the coupling portion including two opposite surfaces on opposite sides of the second axis, with the two opposite surfaces of the coupling portion having a width perpendicular to the second axis, with a groove extending through a center of the pivotal portion, with the groove including first and second sidewalls on an end thereof, with the groove farther including third and fourth sidewalls on another end thereof spaced from the end of the groove along the second axis, with the first and third sidewalls located on a first side of the second axis and spaced from each other by 90°, with the second and fourth sidewalls located on a second side of the second axis opposite to the first side of the second axis, with the second and fourth sidewalls spaced from each other by 90°, with the conical interconnecting portion having a minimum diameter adjacent to the coupling portion; and
a pin extending through the holes of the peripheral wall of the base and the groove of the pivotal portion of the rotating member, with the pin and the groove allowing relative pivotal movement between the pivotal portion of the rotating member and the base about a pivot axis between first and second positions, with the pivot axis perpendicular to the first and second axes and passing through the center of the pivotal portion, with the first and second positions spaced from each other by 90°, with the pivotal portion extending into the first compartment and abutting with the second compartment at the interconnection with the first compartment during pivotal movement of the pivotal portion relative to the base.

2. The universal joint as claimed in claim 1, with the peripheral wall of the base including an inner periphery having a conical abutment section facing the first compartment, with the abutment section being rectilinear in cross section and at an acute angle to the first axis, with the interconnecting portion being rectilinear in cross section and at an acute angle to the second axis.

3. The universal joint as claimed in claim 2, with the holes of the base defined in the abutment section, with the interconnecting portion and the abutment section having a contact surface therebetween when the second axis is at 45° to the first axis, with the contact surface having first and second ends spaced along the first axis, with the pin including a central axis defining the pivot axis, with the central axis of the pin located intermediate first and second ends of the contact surface along the first axis.

4. The universal joint as claimed in claim 3 wherein the pivotal portion is spherical and has a maximum diameter, with the minimum diameter of the interconnecting portion smaller than the maximum diameter of the pivotal portion but not smaller than the width of the coupling portion.

5. The universal joint as claimed in claim 4, with the inner periphery of the peripheral wall of the base further including an enveloping section facing the first compartment, with the enveloping section being concavely arcuate in cross section and extending between the abutment section and the second compartment, with the pivotal portion having a spherical surface in surface contact with the enveloping section, with force exerting on the rotating member transmitted through the enveloping section to the base, reducing the force imparted to the pin.

6. The universal joint as claimed in claim 5, with the second axis extending through the enveloping section when the second axis is at 45° to the first axis, with force along the second axis transmitted directly through the pivotal portion to the enveloping section of the base.

7. The universal joint as claimed in claim 5, with the inner periphery of the peripheral wall of the base further including a receiving section facing the first compartment and extending between the abutment section and an end edge of the peripheral wall, with the receiving section being convexly arcuate in cross section, with the minimum diameter of the interconnecting portion of the rotating member having a spacing to the maximum diameter of the pivotal portion along the second axis, with the spacing larger than a half of the maximum diameter of the pivotal portion, with the minimum diameter of the interconnecting portion of the rotating member abutting the receiving section of the base when the second axis is at 45° to the first axis, with the force exerting on the rotating member transmitted through the receiving section to the base, reducing the force imparted to the pin.

8. The universal joint as claimed in claim 7, with the spacing between the minimum diameter of the interconnecting portion of the rotating member and the maximum diameter of the pivotal portion being smaller than the maximum diameter of the pivotal portion.

9. The universal joint as claimed in claim 7, with the first compartment being trumpet-shaped.

10. The universal joint as claimed in claim 9, further comprising, in combination: a spring mounted in the second compartment and between an end wall of the second compartment and the pivotal portion, with the spring pressing against the pivotal portion, with each of the first, second, third, and fourth sidewalls at 45° to the second axis, with the first and second sidewalls meeting each other at a first connection edge, with the third and fourth sidewalls meeting each other at a second connection edge, with the first and second connection edges spaced from each other and located on the second axis.

* * * * *